(12) United States Patent
Yang et al.

(10) Patent No.: US 10,904,744 B2
(45) Date of Patent: Jan. 26, 2021

(54) TECHNIQUES AND APPARATUSES FOR PROVIDING AN INDICATION REGARDING A FAST SLEEP CAPABILITY IN 5G

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US); Sameh Guirguis, San Diego, CA (US); Atanu Halder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/169,742

(22) Filed: Oct. 24, 2018

(65) Prior Publication Data

US 2019/0159019 A1 May 23, 2019

Related U.S. Application Data

(60) Provisional application No. 62/588,840, filed on Nov. 20, 2017.

(51) Int. Cl.
*G08C 17/00* (2006.01)
*H04W 8/22* (2009.01)
(Continued)

(52) U.S. Cl.
CPC ............ *H04W 8/22* (2013.01); *H04L 1/1614* (2013.01); *H04L 1/1812* (2013.01);
(Continued)

(58) Field of Classification Search
CPC ............ H04W 52/02; H04W 52/0235; H04W 52/0261; H04W 52/0277; H04L 11/0044; H04L 11/0053
See application file for complete search history.

(56) References Cited

U.S. PATENT DOCUMENTS

| | | | | |
|---|---|---|---|---|
| 2010/0195552 A1* | 8/2010 | Ho | ................... | H04W 52/0216 370/311 |
| 2016/0127997 A1* | 5/2016 | Ang | ..................... | H04L 1/1812 370/311 |
| 2017/0303192 A1* | 10/2017 | Sun | ................... | H04W 52/0206 |

OTHER PUBLICATIONS

International Search Report and Written Opinion—PCT/US2018/057518—ISA/EPO—dated Jan. 2, 2019.
(Continued)

*Primary Examiner* — Bo Hui A Zhu
(74) *Attorney, Agent, or Firm* — Qualcomm Incorporated

(57) ABSTRACT

Various aspects of the present disclosure generally relate to wireless communication. In some aspects, a user equipment (UE) may signal, to a base station, an indication that fast sleep is supported by the UE with regard to an inter-slot scheduling configuration or a non-self-contained slot configuration; and receive, based at least in part on signaling the indication that the fast sleep is supported by the UE, signaling indicating the inter-slot scheduling configuration or the non-self-contained slot configuration for the fast sleep, wherein the fast sleep is between at least one of a data grant and a corresponding data communication for the inter-slot scheduling, or a data communication and acknowledgment (ACK)/negative ACK (NACK) feedback regarding the data communication for the non-self-contained slot configuration. Numerous other aspects are provided.

46 Claims, 10 Drawing Sheets

(51) Int. Cl.
  *H04W 52/02* (2009.01)
  *H04L 1/16* (2006.01)
  *H04L 1/18* (2006.01)
  *H04W 72/04* (2009.01)
  *H04W 8/24* (2009.01)

(52) U.S. Cl.
  CPC ... *H04W 52/0216* (2013.01); *H04W 52/0261* (2013.01); *H04W 72/0446* (2013.01); *H04W 8/24* (2013.01)

(56) References Cited

OTHER PUBLICATIONS

NTT Docomo et al., "Data scheduling and HARQ-ACK Feedback Procedures for NR", 3GPP DRAFT; R1-1700625, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017 (Jan. 16, 2017), XP051208150, Retrieved from the Internet: URL:http://www.3gpp.org/ftp/Meetings_3GPP_SYNC/RAN1/ [retrieved on Jan. 16, 2017], 6 pages.

Qualcomm Incorporated: "UE Power Saving during Active State", 3GPP DRAFT; R1-1711227 UE_POWER_SAVING_DURING_ACTIVE_STATE, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017 (Jun. 26, 2017), XP051300426, Retrieved from the Internet: URL:http://www.3gpp.org/ftp/Meetings_3GPP_SYNC/RAN1/Docs/ [retrieved on Jun. 26, 2017], 7 pages.

Qualcomm Incorporated: "UE Power Saving during Active State", 3GPP DRAFT; R2-1711704 UE Power Saving During Active State, 3rd Generation Partnership Project (3GPP), Mobile Competence Centre; 650, Route Des Lucioles; F-06921 Sophia-Antipolis Cedex; France, vol. RAN WG2, No. Prague, Czech; Oct. 9, 2017-Oct. 13, 2017 Oct. 8, 2017 (Oct. 8, 2017), XP051343662, Retrieved from the Internet: URL:http://www.3gpp.org/ftp/Meetings_3GPP_SYNC/RAN2/Docs/ [retrieved on Oct. 8, 2017], 8 pages.

\* cited by examiner

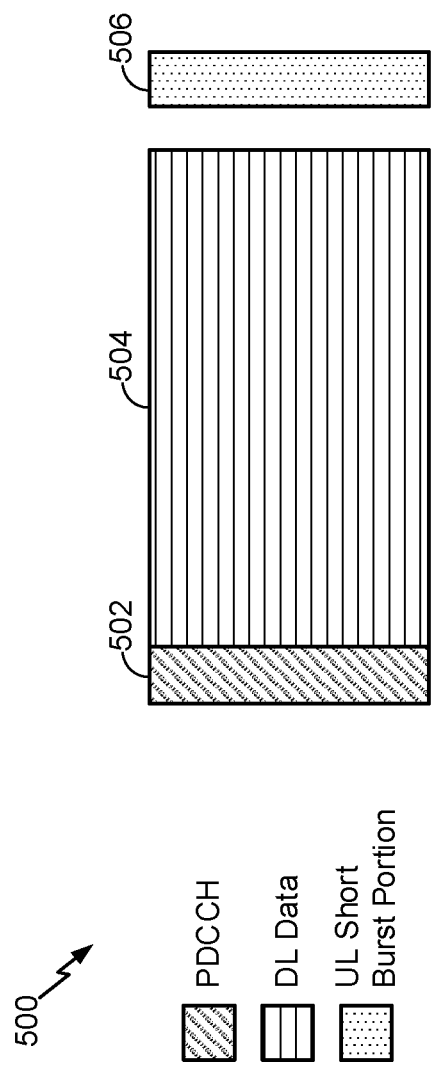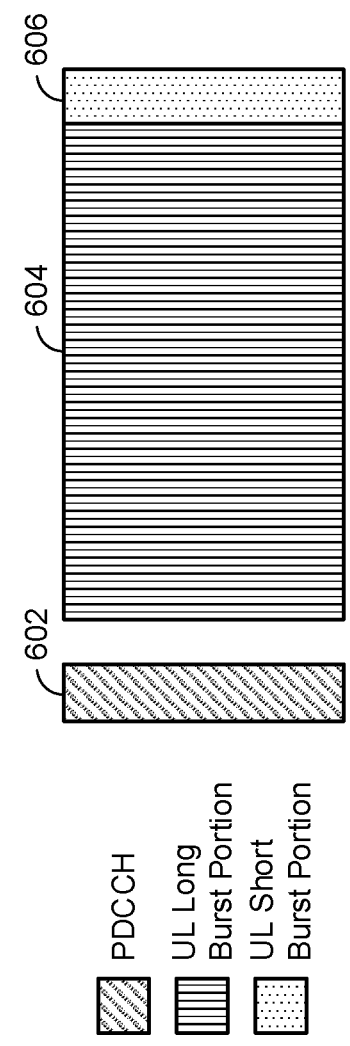

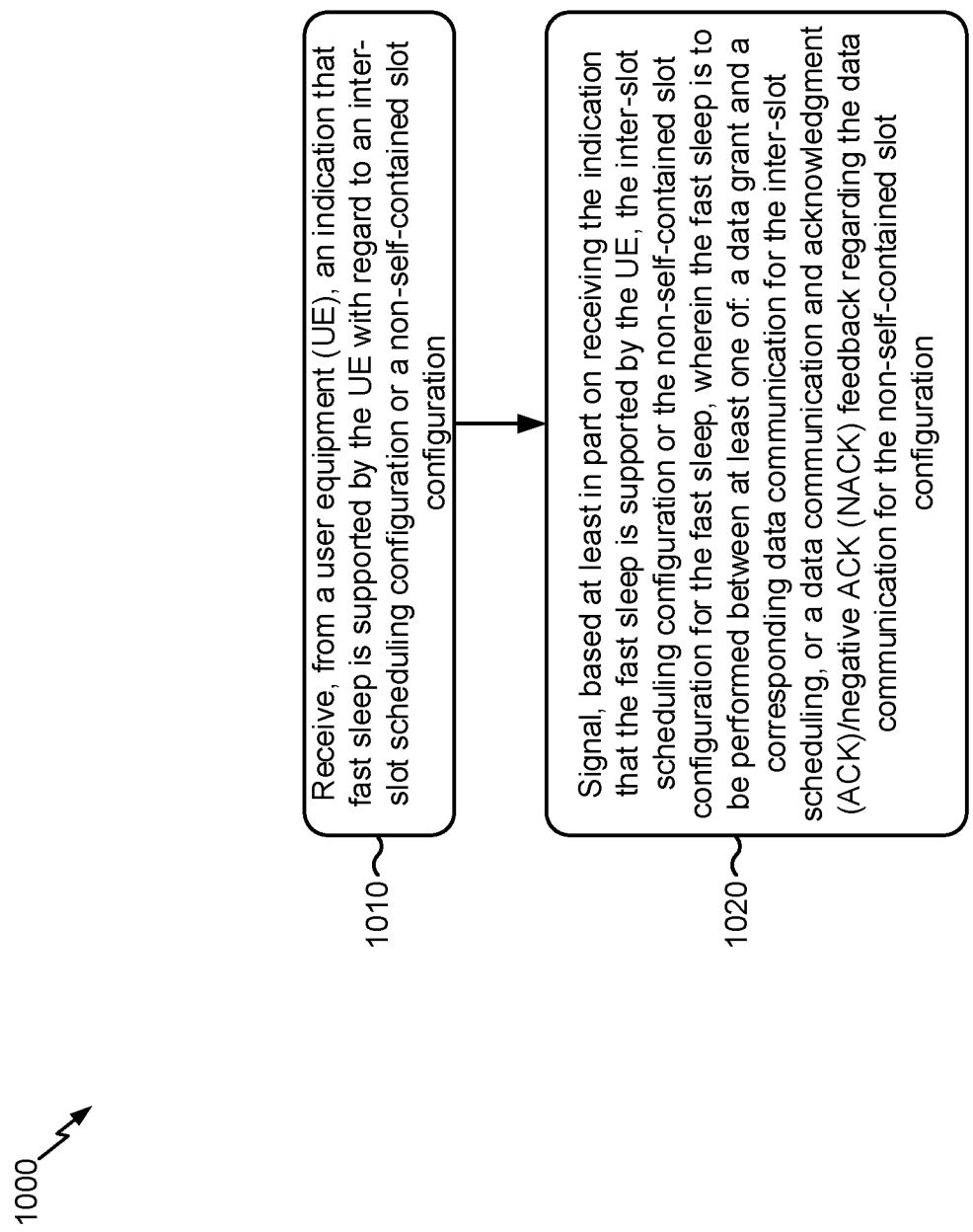

TECHNIQUES AND APPARATUSES FOR PROVIDING AN INDICATION REGARDING A FAST SLEEP CAPABILITY IN 5G

CROSS-REFERENCE TO RELATED APPLICATIONS UNDER 35 U.S.C. § 119

This application claims priority to Provisional Patent Application No. 62/588,840, filed on Nov. 20, 2017, entitled "TECHNIQUES AND APPARATUSES FOR PROVIDING AN INDICATION REGARDING A FAST SLEEP CAPABILITY IN 5G," which is hereby expressly incorporated by reference herein.

FIELD OF THE DISCLOSURE

Aspects of the present disclosure generally relate to wireless communication, and more particularly to techniques and apparatuses for indication regarding a fast sleep capability in 5G.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include signaling, to a base station, an indication that fast sleep is supported by the UE with regard to an inter-slot scheduling configuration or a non-self-contained slot configuration; and receiving, based at least in part on signaling the indication that the fast sleep is supported by the UE, signaling indicating the inter-slot scheduling configuration or the non-self-contained slot configuration for the fast sleep, wherein the fast sleep is between at least one of a data grant and a corresponding data communication for the inter-slot scheduling, or a communication and feedback regarding the communication for the non-self-contained slot configuration.

In some aspects, a UE for wireless communication may include memory and one or more processors operatively coupled to the memory. The memory and the one or more processors may be configured to signal, to a base station, an indication that fast sleep is supported by the UE with regard to an inter-slot scheduling configuration or a non-self-contained slot configuration; and receive, based at least in part on signaling the indication that the fast sleep is supported by the UE, signaling indicating the inter-slot scheduling configuration or the non-self-contained slot configuration for the fast sleep, wherein the fast sleep is between at least one of a data grant and a corresponding data communication for the inter-slot scheduling, or a communication and feedback regarding the communication for the non-self-contained slot configuration.

In some aspects, a non-transitory computer-readable medium may store one or more instructions for wireless communication. The one or more instructions, when executed by one or more processors of a UE, may cause the one or more processors to signal, to a base station, an indication that fast sleep is supported by the UE with regard to an inter-slot scheduling configuration or a non-self-contained slot configuration; and receive, based at least in part on signaling the indication that the fast sleep is supported by the UE, signaling indicating the inter-slot scheduling configuration or the non-self-contained slot configuration for the fast sleep, wherein the fast sleep is between at least one of a data grant and a corresponding data communication for the inter-slot scheduling, or a communication and feedback regarding the communication for the non-self-contained slot configuration.

In some aspects, an apparatus for wireless communication may include means for signaling, to a base station, an indication that fast sleep is supported by the apparatus with regard to an inter-slot scheduling configuration or a non-self-contained slot configuration; and means for receiving, based at least in part on signaling the indication that the fast sleep is supported by the apparatus, signaling indicating the inter-slot scheduling configuration or the non-self-contained slot configuration for the fast sleep, wherein the fast sleep is between at least one of a data grant and a corresponding data communication for the inter-slot scheduling, or a communication and feedback regarding the communication for the non-self-contained slot configuration.

In some aspects, a method of wireless communication performed by a base station may include receiving, from a UE, an indication that fast sleep is supported by the UE with regard to an inter-slot scheduling configuration or a non-self-contained slot configuration; and signaling, based at least in part on receiving the indication that the fast sleep is supported by the UE, the inter-slot scheduling configuration or the non-self-contained slot configuration for the fast sleep, wherein the fast sleep is to be performed between at least one of a data grant and a corresponding data communication for the inter-slot scheduling, or a communication and feedback regarding the communication for the non-self-contained slot configuration.

In some aspects, a base station for wireless communication may include memory and one or more processors operatively coupled to the memory. The memory and the one or more processors may be configured to receive, from a UE, an indication that fast sleep is supported by the UE with regard to an inter-slot scheduling configuration or a non-self-contained slot configuration; and signal, based at least in part on receiving the indication that the fast sleep is supported by the UE, the inter-slot scheduling configuration or the non-self-contained slot configuration for the fast sleep, wherein the fast sleep is to be performed between at least one of a data grant and a corresponding data communication for the inter-slot scheduling, or a communication and feedback regarding the communication for the non-self-contained slot configuration.

In some aspects, a non-transitory computer-readable medium may store one or more instructions for wireless communication. The one or more instructions, when executed by one or more processors of a base station, may cause the one or more processors to receive, from a UE, an indication that fast sleep is supported by the UE with regard to an inter-slot scheduling configuration or a non-self-contained slot configuration; and signal, based at least in part on receiving the indication that the fast sleep is supported by the UE, the inter-slot scheduling configuration or the non-self-contained slot configuration for the fast sleep, wherein the fast sleep is to be performed between at least one of a data grant and a corresponding data communication for the inter-slot scheduling, or a communication and feedback regarding the communication for the non-self-contained slot configuration.

In some aspects, an apparatus for wireless communication may include means for receiving, from a UE, an indication that fast sleep is supported by the UE with regard to an inter-slot scheduling configuration or a non-self-contained slot configuration; and means for signaling, based at least in part on receiving the indication that the fast sleep is supported by the UE, the inter-slot scheduling configuration or the non-self-contained slot configuration for the fast sleep, wherein the fast sleep is to be performed between at least one of a data grant and a corresponding data communication for the inter-slot scheduling, or a communication and feedback regarding the communication for the non-self-contained slot configuration.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a downlink (DL)-centric subframe, in accordance with various aspects of the present disclosure.

FIG. 6 is a diagram illustrating an example of an uplink (UL)-centric subframe, in accordance with various aspects of the present disclosure.

FIG. 10 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
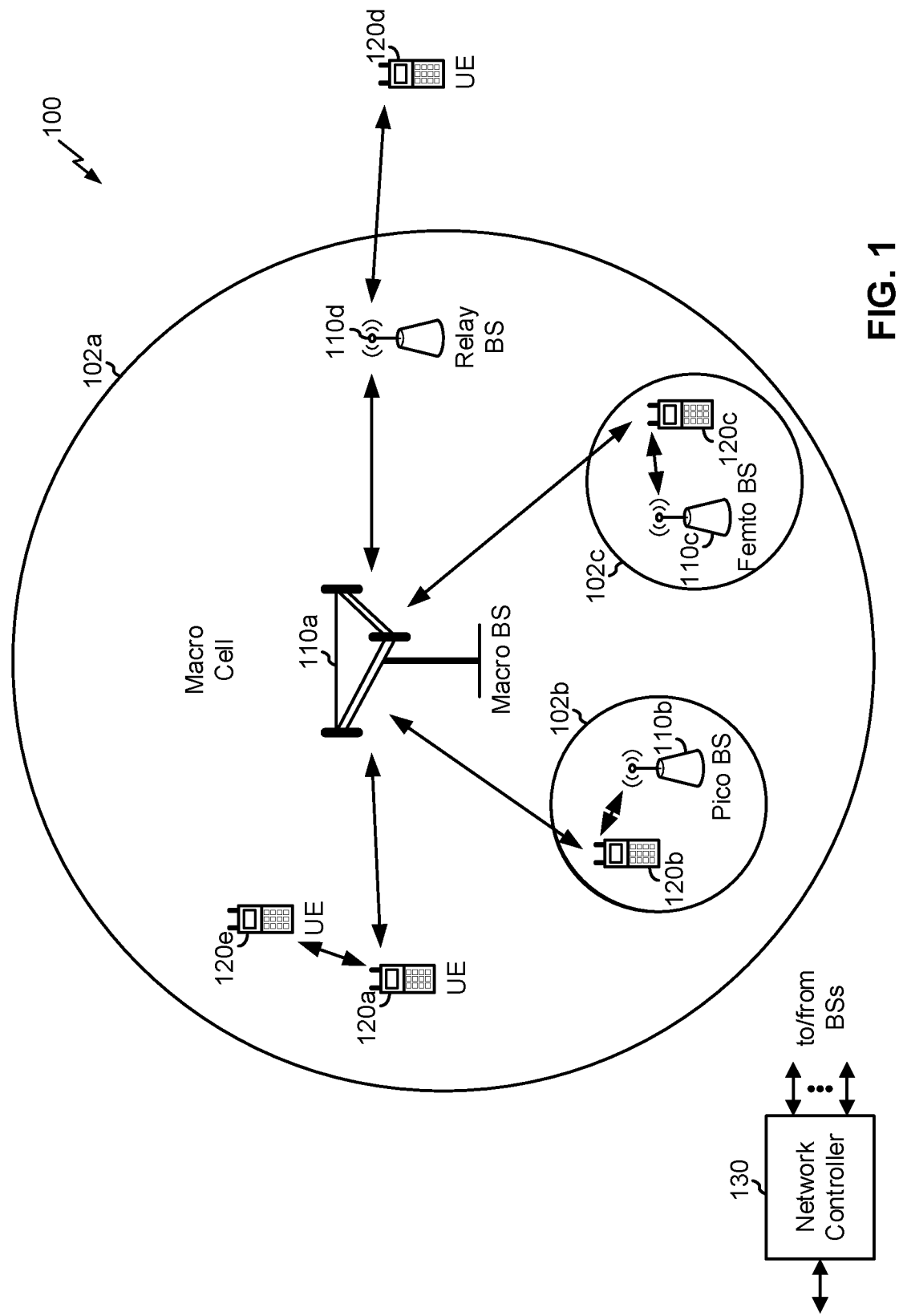
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
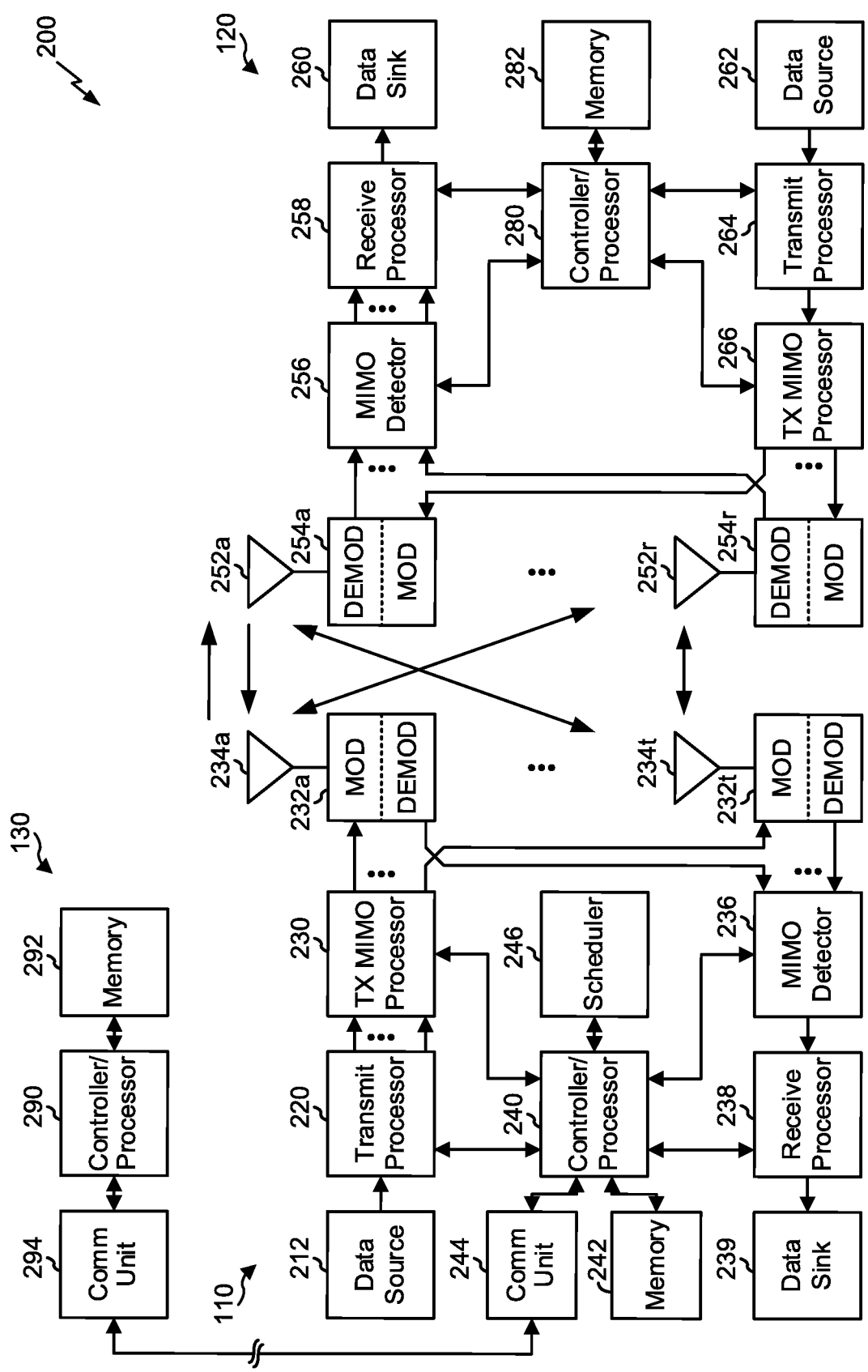
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with indication of fast sleep support for inter-slot scheduling and/or a non-self-contained slot configuration, as described in more detail elsewhere herein. For example, controller/processor 240 of BS 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for signaling, to a base station, an indication that fast sleep is supported by the UE 120 with regard to an inter-slot scheduling configuration or a non-self-contained slot configuration; means for receiving, based at least in part on signaling the indication that the fast sleep is supported by the UE 120, signaling indicating the inter-slot scheduling configuration or the non-self-contained slot configuration for the fast sleep, wherein the fast sleep is between at least one of: a data grant and a corresponding data communication for the inter-slot scheduling, or a data communication and acknowledgment (ACK)/negative ACK (NACK) feedback regarding the data communication for the non-self-contained slot configuration; and/or the like. In some aspects, such means may include one or more components of UE 120 described in connection with FIG. 2.

In some aspects, BS 110 may include means for receiving, from a UE, an indication that fast sleep is supported by the UE with regard to an inter-slot scheduling configuration or a non-self-contained slot configuration; means for signaling, based at least in part on receiving the indication that the fast sleep is supported by the UE, the inter-slot scheduling configuration or the non-self-contained slot configuration for the fast sleep, wherein the fast sleep is to be performed between at least one of: a data grant and a corresponding data communication for the inter-slot scheduling, or a data communication and acknowledgment (ACK)/negative ACK (NACK) feedback regarding the data communication for the non-self-contained slot configuration; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3A:
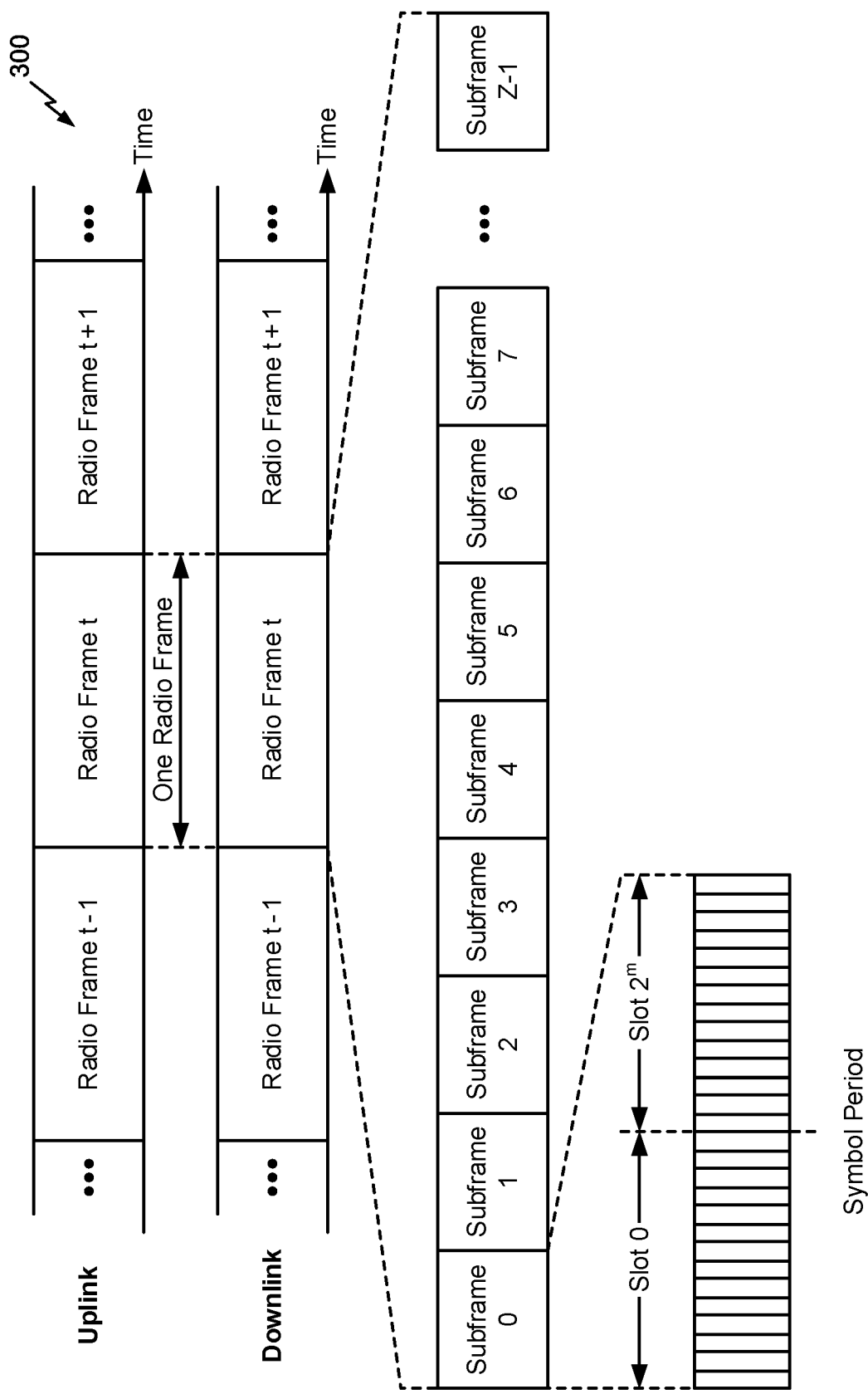
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
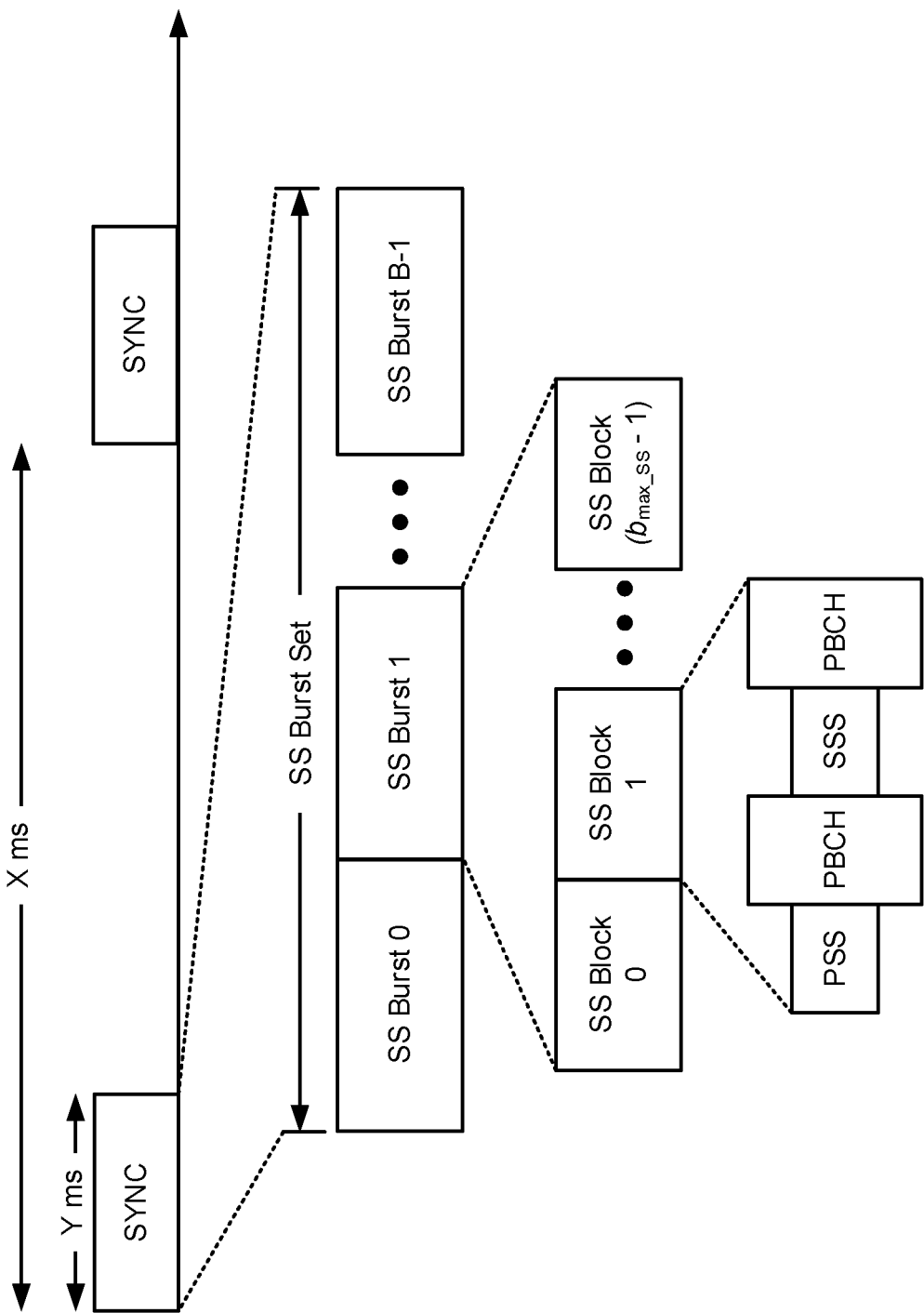
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
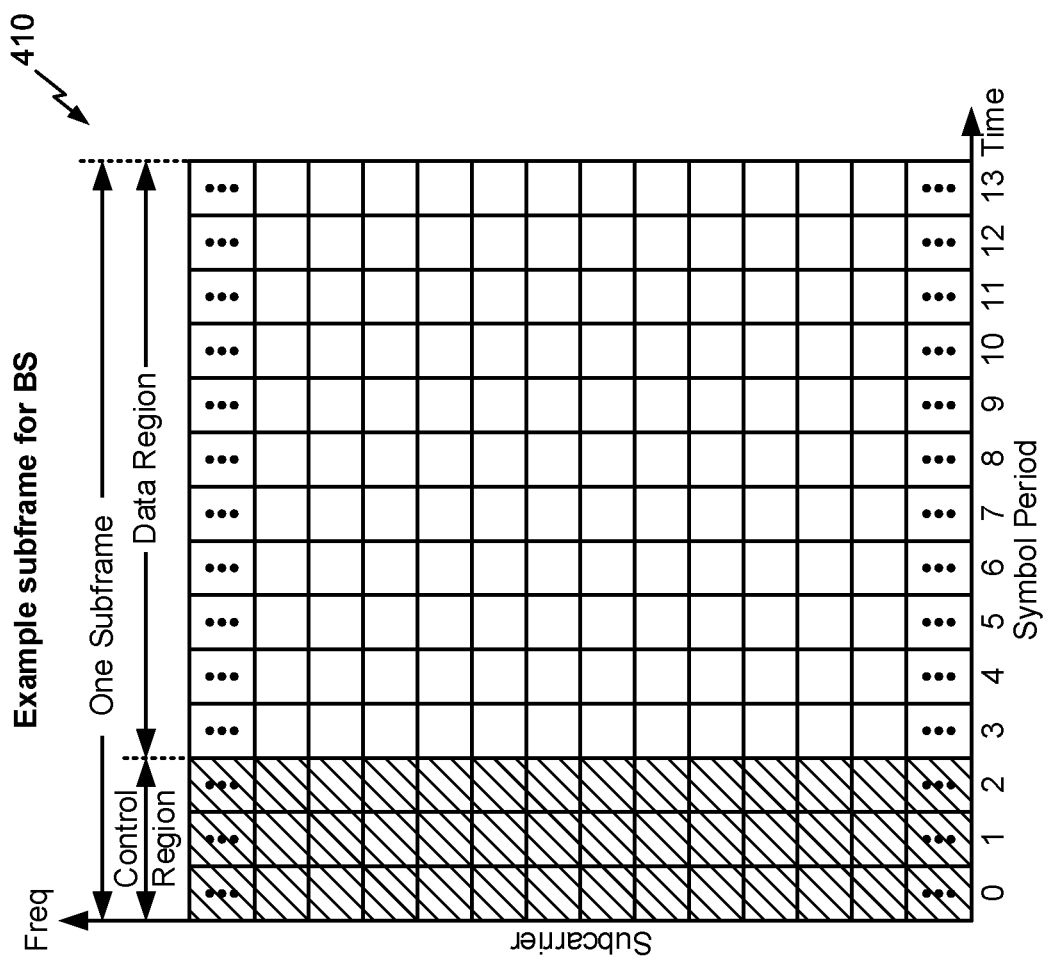
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples are possible and may differ from what was described with regard to FIG. 6.

Figure 7:
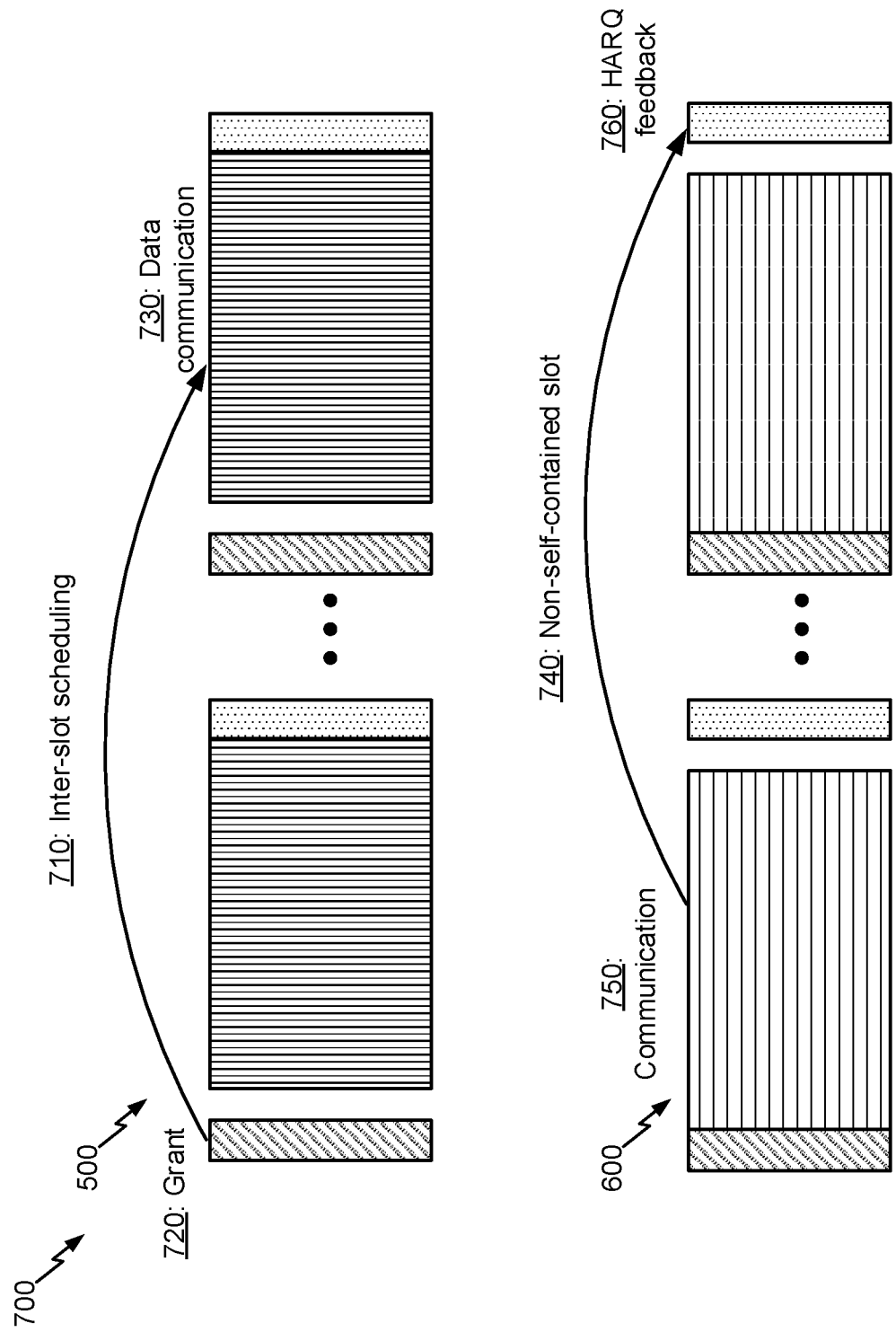
FIG. 7 is a diagram illustrating examples of inter-slot scheduling and a non-self-contained slot configuration, in accordance with various aspects of the present disclosure.

FIG. 7 is a diagram illustrating examples 700 of an inter-slot scheduling configuration and a non-self-contained slot configuration, in accordance with various aspects of the present disclosure. For example 700, assume that a scheduling entity, such as a BS 110, provides scheduling information (e.g., a grant) for a subordinate entity (e.g., a UE 120 and/or the like) for inter-slot scheduling and/or a non-self-contained slot configuration. The grant may be for an uplink communication (e.g., a PUSCH) or a downlink communication (e.g., a PDSCH). Furthermore, the operations described with regard to example 700 are described with reference to the DL-centric subframe 500 and the UL-centric subframe 600, but may be applied with regard to any similar subframe or slot structure having a DL control region, a data region, and a UL region for HARQ feedback.

As shown in FIG. 7, and by reference number 710, in some aspects, a BS 110 may perform inter-slot scheduling. For example, the BS 110 may perform inter-slot scheduling in accordance with an inter-slot scheduling configuration. For inter-slot scheduling, a grant (shown by reference number 720) may be received in a first slot, and a data communication corresponding to the grant (shown by reference number 730) may be received or transmitted in a second slot other than the first slot. Here, the first slot and the second slot are shown as DL-centric subframes. In some aspects, the first slot and/or the second slot may both be UL-centric subframes, or one may be a DL-centric subframe and the other may be a UL-centric subframe. Zero or more frames may be positioned between the first frame and the second frame. For example, the first slot and the second slot may be consecutive, or may be separated by one or more slots or subframes.

As shown by reference number 740, in some aspects, the BS 110 and the UE 120 may communicate using a non-self-contained slot configuration. In the non-self-contained slot configuration, a communication 750 is performed in a first slot, and feedback 760 (e.g., HARQ feedback) regarding the communication is provided in a second slot. In some aspects, the communication 750 may be a downlink communication and the feedback 760 may be provided on the uplink. In some aspects, the communication 750 may be an uplink communication and the HARQ feedback 760 may be provided on the downlink.

The inter-slot scheduling configuration and the non-self-contained configuration may provide a gap or delay between the grant 720 and the data communication 730, and/or between the communication 750 and the HARQ feedback 760. In some aspects, the gap or delay may be identified as follows:

$K_0$: Delay, in slots, between the downlink grant and the corresponding downlink data reception.
$K_1$: Delay, in slots, between the downlink data reception and the corresponding HARQ feedback.
$K_2$: Delay, in slots, between the uplink grant reception and the uplink data transmission.

The terms $K_0$, $K_1$, and $K_2$ may be used elsewhere herein to refer to these delays or gaps. Furthermore, $K_0$, $K_1$, and $K_2$ may be expressed in any unit and are not limited to expression in terms of slots.

The gap between the grant 720 and the data communication 730, and/or between the communication 750 and the feedback 760, may provide an opportunity for the UE 120 to enter a low power mode, such as a deep sleep. This may conserve battery power of the UE 120. However, in some cases, the UE 120 may not have enough time to activate and then deactivate the deep sleep within the gap. For example, a subcarrier spacing of a frequency of the UE 120 may be too narrow for the deep sleep, or a QoS or user experience of the UE 120 may not be sustainable when the deep sleep is performed.

As indicated above, FIG. 7 is provided as an example. Other examples are possible and may differ from what was described with respect to FIG. 7.

A UE (e.g., UE 120) may perform certain operations to conserve battery power. One such operation is a fast sleep operation. In a fast sleep operation, the UE may enter a low power mode between transmissions or receptions of the UE. For example, the UE may perform fast sleep between a grant and a communication and/or between a communication and HARQ feedback regarding the communication (e.g., in the gap associated with $K_1$, $K_1$, and/or $K_2$), as described in more detail in connection with FIG. 7, above. However, in some situations, the UE may not be capable of performing fast sleep, or performing fast sleep may impact performance of the UE. For example, the UE may not be capable of performing fast sleep in some frequency bands and/or sub-carrier spacings, or the UE may not be capable of performing fast sleep without impacting quality of service (QoS) or user experience.

Some techniques and apparatuses described herein provide indication of fast sleep capabilities of a UE with regard to inter-slot scheduling and/or a non-self-contained slot configuration. For example, the UE may indicate that the UE supports fast sleep for a frequency and/or subcarrier spacing of the UE with regard to inter-slot scheduling and/or a non-self-contained slot configuration. In some aspects, the UE may indicate that a QoS or user experience threshold can be satisfied when fast sleep is performed. In some aspects, the UE may signal one or more minimum delays or gaps for the fast sleep (e.g., in terms of a K0, K1, and/or K2 value). A scheduling entity (e.g., BS 110) may signal or perform the inter-slot scheduling and/or the non-self-contained slot configuration based at least in part on the indication and/or the one or more minimum delays or gaps. The UE may perform fast sleep accordingly. In this way, battery resources of the UE are conserved and efficiency of the network is improved.

Figure 8:
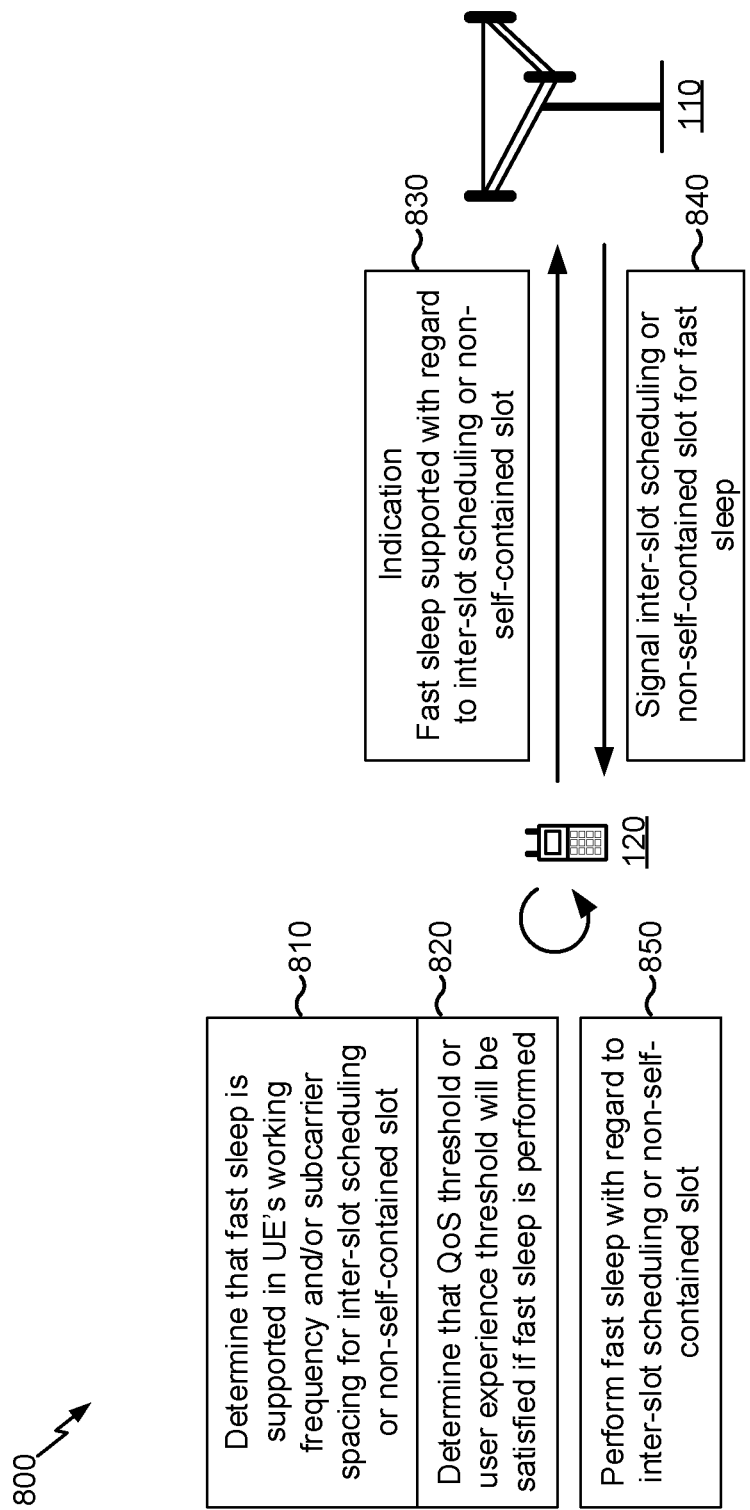
FIG. 8 is a diagram illustrating examples of indicating user equipment support for fast sleep with regard to inter-slot scheduling and/or a non-self-contained slot configuration, in accordance with various aspects of the present disclosure.

FIG. 8 is a diagram illustrating an example 800 of indicating user equipment support for fast sleep with regard to inter-slot scheduling and/or a non-self-contained slot configuration, in accordance with various aspects of the present disclosure.

As shown in FIG. 8, and by reference number 810, a UE 120 may determine that fast sleep is supported. In some aspects, the UE 120 may determine that the fast sleep is supported for a working frequency and/or subcarrier spacing of the UE 120. For example, the UE 120 may determine that fast sleep can be performed with regard to at least one of an inter-slot scheduling configuration and/or a non-self-contained slot configuration of the UE 120 for the working frequency and/or the subcarrier spacing. In some aspects, the UE 120 may determine that the subcarrier spacing is within a particular range (e.g., between 15 kHz and 60 kHZ, or in a different range), and may determine that fast sleep is supported when the subcarrier spacing is within the particular range. In some aspects, the UE 120 may determine that the working frequency satisfies a threshold (e.g., below 6 GHz or a different threshold) or is associated with one of one or more predefined bands and may determine that fast sleep is supported when the working frequency satisfies the threshold or is associated with one of the one or more predefined bands.

As shown by reference number 820, the UE 120 may determine whether a QoS threshold or user experience threshold will be satisfied if fast sleep is performed. In some aspects, the UE 120 may determine whether the QoS threshold or user experience threshold will be satisfied if the inter-slot scheduling and/or the non-self-contained slot configuration are performed. In some aspects, the UE 120 may perform this determination based at least in part on a throughput and/or latency associated with the QoS threshold and/or the user experience threshold. For example, if the throughput and/or latency does not satisfy the QoS threshold and/or the user experience threshold when the inter-slot scheduling and/or the non-self-contained slot configuration are performed, or when fast sleep is performed with regard to the inter-slot scheduling and/or the non-self-contained slot configuration, the UE 120 may determine that the QoS threshold and/or user experience threshold are not satisfied. When at least one of the QoS threshold or the user experience threshold is not satisfied, the UE 120 may not provide an indication that fast sleep is to be performed with regard to the inter-slot scheduling and/or the non-self-contained slot configuration, which may preserve QoS and user experience.

As shown by reference number 830, the UE 120 may provide, to a BS 110, an indication that fast sleep is supported with regard to the inter-slot scheduling and/or the non-self-contained slot configuration. In some aspects, the indication may include an inter-slot scheduling request. For example, when the UE 120 determines that fast sleep is supported for inter-slot scheduling, the UE 120 may provide an inter-slot scheduling request to request that the BS 110 perform inter-slot scheduling. In some aspects, the indication may include a non-self-contained slot configuration request. For example, when the UE 120 determines that fast sleep is supported for the non-self-contained slot configuration, the UE 120 may provide a non-self-contained configuration request to request that the BS 110 perform the non-self-contained slot configuration. In some aspects, the indication may include an inter-slot scheduling request and a non-self-contained slot configuration request.

In some aspects, the indication may include a control element, such as a media access control (MAC) control element. Additionally, or alternatively, the indication may identify a minimum and/or maximum number of slots. For example, the indication may identify a minimum number of slots between a grant and a corresponding data communication, or between a communication and a corresponding HARQ feedback, so that the UE 120 has sufficient time to enter and exit fast sleep. As another example, the indication may identify a maximum number of slots between a grant and a corresponding data communication, or between a communication and a corresponding HARQ feedback, so that a QoS threshold or a user experience threshold of the UE 120 are satisfied.

In some aspects, the indication may identify the minimum number of slots in terms of a $K_0$ value, a $K_1$ value, a $K_2$ value, and/or the like. In some aspects, the UE 120 may determine the $K_0$ value, the $K_1$ value, and/or the $K_2$ value. In some aspects, the UE 120 may determine and/or signal multiple $K_0$ values, $K_1$ values, and/or $K_2$ values. For example, the UE 120 may determine respective $K_0$, $K_1$, and/or $K_2$ values for which the UE 120 supports fast sleep, and for which the QoS threshold or the user experience threshold are satisfied.

As shown by reference number 840, the BS 110 may signal inter-slot scheduling and/or a non-self-contained slot configuration for the fast sleep for the UE 120. For example, the BS 110 may signal at least one of an inter-slot scheduling configuration (e.g., may provide an inter-slot scheduling grant) and/or a non-self-contained slot configuration based at least in part on the indication received from the UE 120. In some aspects, the BS 110 may determine whether to perform inter-slot scheduling and/or to signal the non-self-contained slot configuration for the fast sleep (e.g., based at least in part on traffic conditions, capabilities of the BS 110 and/or UE 120, a throughput of the BS 110 and/or UE 120, and/or the like). In some aspects, the BS 110 may not provide control information to the UE 120 in the gaps associated with the inter-slot scheduling and/or the non-self-contained slot configuration.

In some aspects, the BS 110 may configure the inter-slot scheduling configuration and/or the non-self-contained slot configuration based at least in part on the indication. For example, the BS 110 may use a minimum or maximum delay or gap identified by a $K_0$, $K_1$, and/or $K_2$ value of the indication. In some aspects, the BS 110 may determine whether fast sleep is supported, and whether a QoS or user experience threshold can be satisfied, based at least in part on the indication. For example, the BS 110 may perform such a determination based at least in part on whether a $K_0$, $K_1$, or $K_2$ value associated with the fast sleep, and a $K_0$, $K_1$, and/or $K_2$ value associated with the QoS or user experience threshold, can be satisfied in view of scheduling constraints, network conditions, and/or the like. The BS 110 may signal the inter-slot scheduling (e.g., the inter-slot scheduling configuration, a grant for the inter-slot scheduling, etc.) or the non-self-contained slot configuration in accordance with such a determination.

As shown by reference number 850, the UE 120 may perform fast sleep with regard to the inter-slot scheduling and/or the non-self-contained slot configuration. For example, the UE 120 may receive signaling identifying the inter-slot scheduling (e.g., the inter-slot scheduling configuration, a grant associated with the inter-slot scheduling, etc.) and/or the non-self-contained slot configuration for fast sleep. To perform the fast sleep, the UE 120 may not monitor a control channel and/or a data channel in the gap between the data grant and the corresponding data communication, and/or in the gap between the communication and the HARQ feedback (e.g., the gaps defined by $K_0$, $K_1$, and/or $K_2$). For example, the UE 120 may perform fast sleep in between a grant and a corresponding data communication of the inter-slot scheduling. Additionally, or alternatively, the UE 120 may perform fast sleep in between a communication and corresponding HARQ feedback of the non-self-contained slot configuration. In this way, the UE 120 conserves battery resources that would otherwise be used to remain in an active state other than the fast sleep during inter-slot scheduling and/or the non-self-contained slot configuration.

As indicated above, FIG. 8 is provided as an example. Other examples are possible and may differ from what was described with respect to FIG. 8.

Figure 9:
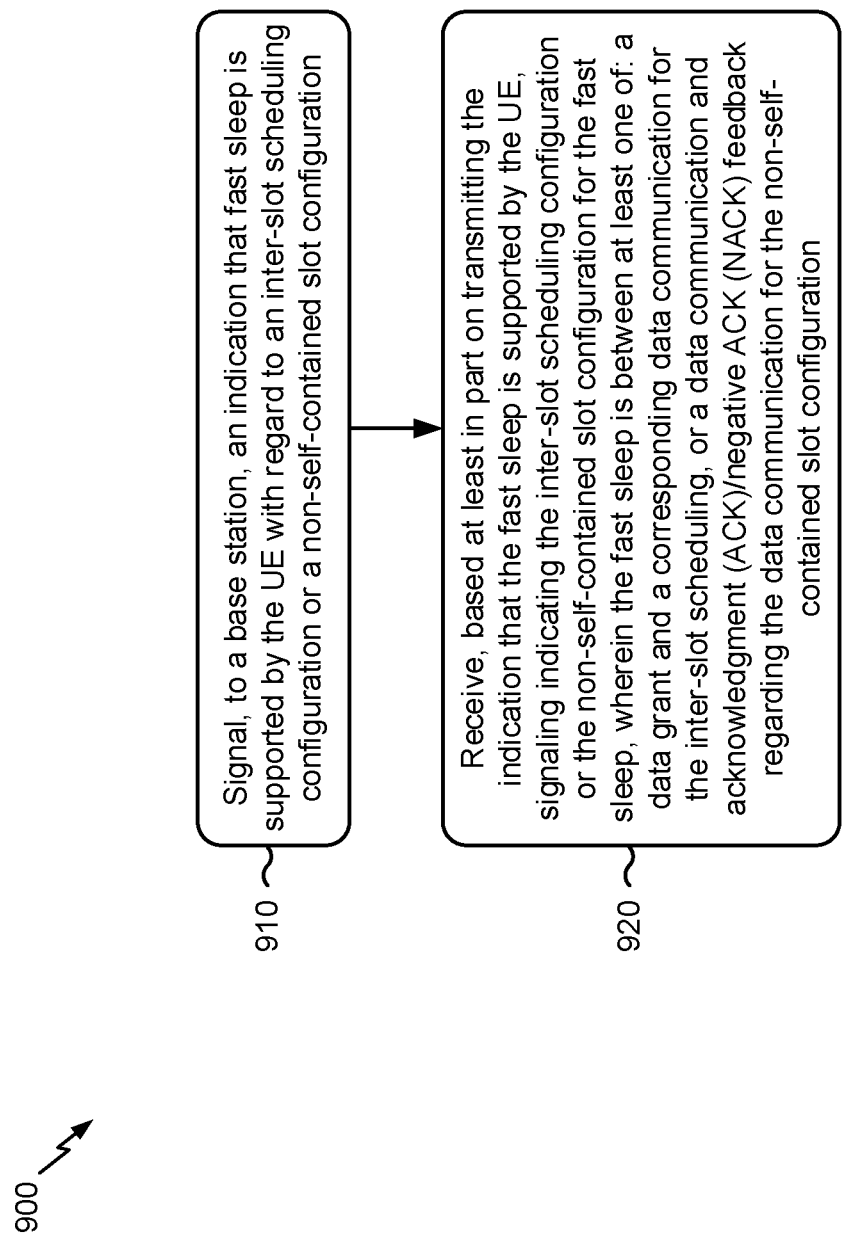
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) signals an indication for fast sleep with regard to inter-slot scheduling and/or a non-self-contained slot configuration.

As shown in FIG. 9, in some aspects, process 900 may include signaling, to a base station, an indication that fast sleep is supported by the UE with regard to an inter-slot scheduling configuration or a non-self-contained slot configuration (block 910). For example, the UE (e.g., using controller/processor 280, transmit processor 264, TX MIMO processor 266, MOD 254, antenna 252, and/or the like) may transmit an indication that fast sleep is supported with regard to inter-slot scheduling or a non-self-contained slot configuration. In some aspects, the indication may include a request for inter-slot scheduling and/or a request for the non-self-contained slot configuration. For example, the UE may provide the indication based at least in part on a determination that the UE can perform fast sleep in a gap associated with the inter-slot scheduling or the non-self-contained slot configuration.

As shown in FIG. 9, in some aspects, process 900 may include receiving, based at least in part on signaling the indication that the fast sleep is supported by the UE, signaling indicating the inter-slot scheduling configuration or the non-self-contained slot configuration for the fast sleep, wherein the fast sleep is between at least one of: a data grant and a corresponding data communication for the inter-slot scheduling, or a data communication and acknowledgment (ACK)/negative ACK (NACK) feedback regarding the data communication for the non-self-contained slot configuration (block 920). For example, the UE (e.g., using antenna 252, DEMOD 254, MIMO detector 256, receive processor 258, controller/processor 280, and/or the like) may perform fast sleep. In some aspects, the UE (e.g., using antenna 252, DEMOD 254, MIMO detector 256, receive processor 258, controller/processor 280, and/or the like) may receive signaling indicating the inter-slot scheduling, the inter-slot scheduling configuration, and/or the non-self-contained slot configuration. In some aspects, the UE may perform the fast sleep between a data grant and a corresponding data communication for inter-slot scheduling. Additionally, or alternatively, the UE may perform the fast sleep between a communication and feedback (e.g., HARQ feedback) regarding the communication for the non-self-contained slot configuration.

Process 900 may include additional aspects, such as any single aspect or any combination of aspects described below and/or in connection with one or more other processes described elsewhere herein.

In some aspects, the indication identifies one or more minimum values for a delay for the fast sleep between the data grant and the corresponding data communication, or between the data communication and the ACK/NACK feedback. In some aspects, the indication indicates that a quality of service threshold or a user perception threshold is satisfied when the inter-slot scheduling configuration or the non-self-contained slot configuration for fast sleep is to be used. In some aspects, the indication indicates one or more minimum values for a delay for the fast sleep between the data grant and the corresponding data communication, or between the data communication and the ACK/NACK feedback, and the quality of service threshold or the user perception threshold is satisfied when the one or more minimum values for the delay are used. In some aspects, the indication identifies at least one of a minimum number of slots or a maximum number of slots associated with the fast sleep.

In some aspects, the data grant is associated with a physical downlink control channel (PDCCH) and the corresponding data communication is associated with a physical downlink shared channel (PDSCH) or a physical uplink shared channel (PUSCH). In some aspects, the data communication is associated with a physical downlink shared channel (PDSCH) or a physical uplink shared channel (PUSCH), and the ACK/NACK feedback is associated with a hybrid automatic repeat request (HARD) process for the PDSCH or the PUSCH.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with various aspects of the present disclosure. Example process 1000 is an example where a base station (e.g., BS 110) performs signaling relating to inter-slot scheduling and/or a non-self-contained slot configuration based at least in part on signaling and/or an indication from a UE regarding fast sleep.

As shown in FIG. 10, in some aspects, process 1000 may include receiving, from a user equipment (UE), an indication that fast sleep is supported by the UE with regard to an inter-slot scheduling configuration or a non-self-contained slot configuration (block 1010). For example, the base station (e.g., using antenna 234, DEMOD 232, MIMO detector 236, receive processor 238, controller/processor 240, and/or the like) may receive signaling identifying an indication (e.g., a MAC control element, radio resource control (RRC) signaling, etc.) from a UE. The indication may indicate that fast sleep is supported by the UE with regard to inter-slot scheduling or a non-self-contained slot configuration of the UE. In some aspects, the indication may indicate that a QoS or user experience threshold is satisfied with regard to the fast sleep. In some aspects, the indication may identify one or more $K_0$, $K_1$, and/or $K_2$ values. In some aspects, the UE may provide a request for inter-slot scheduling and/or a request for the non-self-contained slot configuration.

As shown in FIG. 10, in some aspects, process 1000 may include signaling, based at least in part on receiving the indication that the fast sleep is supported by the UE, the inter-slot scheduling configuration or the non-self-contained slot configuration for the fast sleep, wherein the fast sleep is to be performed between at least one of: a data grant and a corresponding data communication for the inter-slot scheduling, or a data communication and acknowledgment (ACK)/negative ACK (NACK) feedback regarding the data communication for the non-self-contained slot configuration (block 1020). For example, the base station (e.g., using controller/processor 240, transmit processor 220, TX MIMO processor 230, MOD 232, antenna 234, and/or the like) may provide signaling indicating the inter-slot scheduling (e.g., an inter-slot scheduling configuration, a grant for inter-slot scheduling, etc.) or the non-self-contained slot configuration for the fast sleep. In some aspects, the base station may selectively signal and/or perform the inter-slot scheduling and/or the non-self-contained slot configuration. In some aspects, the base station may perform the inter-slot scheduling and/or the non-self-contained slot configuration to allow the UE to perform fast sleep with regard to the inter-slot scheduling and/or the non-self-contained slot configuration.

Process 1000 may include additional aspects, such as any single aspect or any combination of aspects described below and/or in connection with one or more other processes described elsewhere herein.

In some aspects, the indication identifies at least one of a minimum number of slots or a maximum number of slots associated with the fast sleep, and the inter-slot scheduling configuration or the non-self-contained slot configuration is based at least in part on the minimum number of slots or the maximum number of slots.

In some aspects, the indication identifies one or more minimum values for a delay, in slots, for the fast sleep between the data grant and the corresponding data communication, or between the data communication and the ACK/NACK feedback.

In some aspects, the indication indicates that a quality of service threshold or a user perception threshold is satisfied when the inter-slot scheduling or the non-self-contained slot configuration with fast sleep is to be performed. In some aspects, the indication indicates one or more minimum values for a delay, in slots, for the fast sleep between the data grant and the corresponding data communication, or between the data communication and the ACK/NACK feedback, and the quality of service threshold or the user perception threshold is satisfied when the one or more minimum values for the delay are used. In some aspects, the data grant is associated with a physical downlink control channel (PDCCH) and the corresponding data communication is associated with a physical downlink shared channel (PDSCH) or a physical uplink shared channel (PUSCH). In some aspects, the data communication is associated with a physical downlink shared channel (PDSCH) or a physical uplink shared channel (PUSCH), and wherein the ACK/NACK feedback is associated with a hybrid automatic repeat request (HARD) process for the PDSCH or the PUSCH.

In some aspects, the inter-slot scheduling configuration or the non-self-contained slot configuration is signaled based at least in part on a determination that the inter-slot scheduling or the non-self-contained slot configuration is to be performed, and wherein the determination is based at least in part on the indication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    signaling, to a base station, an indication that fast sleep is supported by the UE with regard to an inter-slot scheduling configuration or a non-self-contained slot configuration,
    wherein at least one of:
        the indication indicates that a quality of service threshold or a user perception threshold is satisfied when the inter-slot scheduling configuration or the non-self-contained slot configuration for fast sleep is to be used, or
        the indication identifies at least one of a minimum number of slots or a maximum number of slots associated with the fast sleep; and
    receiving signaling indicating the inter-slot scheduling configuration or the non-self-contained slot configuration for the fast sleep, wherein the fast sleep is between at least one of:
        a data grant and a corresponding data communication for the inter-slot scheduling, or
        a data communication and acknowledgment (ACK)/negative ACK (NACK) feedback regarding the data communication for the non-self-contained slot configuration.

2. The method of claim 1, wherein the indication identifies one or more minimum values for a delay for the fast sleep between the data grant and the corresponding data communication, or between the data communication and the ACK/NACK feedback.

3. The method of claim 1, wherein the indication indicates that the quality of service threshold or the user perception threshold is satisfied when the inter-slot scheduling configuration or the non-self-contained slot configuration for fast sleep is to be used.

4. The method of claim 3, wherein the indication indicates one or more minimum values for a delay for the fast sleep between the data grant and the corresponding data communication, or between the data communication and the ACK/NACK feedback, and wherein the quality of service threshold or the user perception threshold is satisfied when the one or more minimum values for the delay are used.

5. The method of claim 1, wherein the indication identifies at least one of the minimum number of slots or the maximum number of slots associated with the fast sleep.

6. The method of claim 1, wherein the data grant is associated with a physical downlink control channel (PDCCH) and the corresponding data communication is associated with a physical downlink shared channel (PDSCH) or a physical uplink shared channel (PUSCH).

7. The method of claim 1, wherein the data communication is associated with a physical downlink shared channel (PDSCH) or a physical uplink shared channel (PUSCH), and wherein the ACK/NACK feedback is associated with a hybrid automatic repeat request (HARD) process for the PDSCH or the PUSCH.

8. The method of claim 1, wherein the signaling indicating the inter-slot scheduling configuration or the non-self-contained slot configuration for the fast sleep is received based at least in part on signaling the indication that the fast sleep is supported by the UE.

9. The method of claim 1, further comprising:
determining the quality of service threshold or the user perception threshold will be satisfied if fast sleep is performed, and
wherein the indication that fast sleep is supported by the UE is signaled to the base station based at least in part on determining the quality of service threshold or the user perception threshold will be satisfied if fast sleep is performed.

10. A method of wireless communication performed by a base station, comprising:
receiving, from a user equipment (UE), an indication that fast sleep is supported by the UE with regard to an inter-slot scheduling configuration or a non-self-contained slot configuration,
wherein at least one of:
the indication indicates that a quality of service threshold or a user perception threshold is satisfied when the inter-slot scheduling configuration or the non-self-contained slot configuration for fast sleep is to be used, or
the indication identifies at least one of a minimum number of slots or a maximum number of slots associated with the fast sleep; and
signaling the inter-slot scheduling configuration or the non-self-contained slot configuration for the fast sleep, wherein the fast sleep is to be performed between at least one of:
a data grant and a corresponding data communication for the inter-slot scheduling, or
a data communication and acknowledgment (ACK)/ negative ACK (NACK) feedback regarding the data communication for the non-self-contained slot configuration.

11. The method of claim 10, wherein the indication identifies at least one of the minimum number of slots or the maximum number of slots associated with the fast sleep, and wherein the inter-slot scheduling configuration or the non-self-contained slot configuration is based at least in part on the minimum number of slots or the maximum number of slots.

12. The method of claim 10, wherein the indication identifies one or more minimum values for a delay for the fast sleep between the data grant and the corresponding data communication, or between the data communication and the ACK/NACK feedback.

13. The method of claim 10, wherein the indication indicates that the quality of service threshold or the user perception threshold is satisfied when the inter-slot scheduling or the non-self-contained slot configuration with fast sleep is to be performed.

14. The method of claim 13, wherein the indication indicates one or more minimum values for a delay for the fast sleep between the data grant and the corresponding data communication, or between the data communication and the ACK/NACK feedback, and wherein the quality of service threshold or the user perception threshold is satisfied when the one or more minimum values for the delay are used.

15. The method of claim 10, wherein the data grant is associated with a physical downlink control channel (PDCCH) and the corresponding data communication is associated with a physical downlink shared channel (PDSCH) or a physical uplink shared channel (PUSCH).

16. The method of claim 10, wherein the data communication is associated with a physical downlink shared channel (PDSCH) or a physical uplink shared channel (PUSCH), and wherein the ACK/NACK feedback is associated with a hybrid automatic repeat request (HARQ) process for the PDSCH or the PUSCH.

17. The method of claim 10, wherein the inter-slot scheduling configuration or the non-self-contained slot configuration is signaled based at least in part on a determination that the inter-slot scheduling or the non-self-contained slot configuration is to be performed, and wherein the determination is based at least in part on the indication.

18. The method of claim 10, wherein the inter-slot scheduling configuration or the non-self-contained slot configuration for the fast sleep is signaled based at least in part on receiving the indication that the fast sleep is supported by the UE.

19. A user equipment (UE) for wireless communication, comprising:
a memory; and
one or more processors coupled to the memory, the memory and the one or more processors configured to:
signal, to a base station, an indication that fast sleep is supported by the UE with regard to an inter-slot scheduling configuration or a non-self-contained slot configuration,
wherein at least one of:
the indication indicates that a quality of service threshold or a user perception threshold is satisfied when the inter-slot scheduling configuration or the non-self-contained slot configuration for fast sleep is to be used, or
the indication identifies at least one of a minimum number of slots or a maximum number of slots associated with the fast sleep; and
receive signaling indicating the inter-slot scheduling configuration or the non-self-contained slot configuration for the fast sleep, wherein the fast sleep is between at least one of:
a data grant and a corresponding data communication for the inter-slot scheduling, or
a data communication and acknowledgment (ACK)/ negative ACK (NACK) feedback regarding the data communication for the non-self-contained slot configuration.

20. The UE of claim 19, wherein the indication identifies one or more minimum values for a delay for the fast sleep between the data grant and the corresponding data communication, or between the data communication and the ACK/NACK feedback.

21. The UE of claim 19, wherein the indication indicates that the quality of service threshold or the user perception threshold is satisfied when the inter-slot scheduling configuration or the non-self-contained slot configuration for fast sleep is to be used.

22. The UE of claim 21, wherein the indication indicates one or more minimum values for a delay for the fast sleep between the data grant and the corresponding data communication, or between the data communication and the ACK/NACK feedback, and wherein the quality of service threshold or the user perception threshold is satisfied when the one or more minimum values for the delay are used.

23. The UE of claim 19, wherein the indication identifies at least one of the minimum number of slots or the maximum number of slots associated with the fast sleep.

24. The UE of claim 19, wherein the data grant is associated with a physical downlink control channel (PDCCH) and the corresponding data communication is associated with a physical downlink shared channel (PDSCH) or a physical uplink shared channel (PUSCH).

25. The UE of claim 19, wherein the data communication is associated with a physical downlink shared channel (PDSCH) or a physical uplink shared channel (PUSCH), and wherein the ACK/NACK feedback is associated with a hybrid automatic repeat request (HARD) process for the PDSCH or the PUSCH.

26. The UE of claim 19, wherein the signaling indicating the inter-slot scheduling configuration or the non-self-contained slot configuration for the fast sleep is received based at least in part on signaling the indication that the fast sleep is supported by the UE.

27. The UE of claim 19, wherein the memory and the one or more processors are further configured to:
 determine the quality of service threshold or the user perception threshold will be satisfied if fast sleep is performed, and
 wherein the indication that fast sleep is supported by the UE is signaled to the base station based at least in part on determining the quality of service threshold or the user perception threshold will be satisfied if fast sleep is performed.

28. A base station for wireless communication, comprising:
 a memory; and
 one or more processors coupled to the memory, the memory and the one or more processors configured to:
  receive, from a user equipment (UE), an indication that fast sleep is supported by the UE with regard to an inter-slot scheduling configuration or a non-self-contained slot configuration,
   wherein at least one of:
    the indication indicates that a quality of service threshold or a user perception threshold is satisfied when the inter-slot scheduling configuration or the non-self-contained slot configuration for fast sleep is to be used, or
    the indication identifies at least one of a minimum number of slots or a maximum number of slots associated with the fast sleep; and
  signal the inter-slot scheduling configuration or the non-self-contained slot configuration for the fast sleep, wherein the fast sleep is to be performed between at least one of:
    a data grant and a corresponding data communication for the inter-slot scheduling, or
    a data communication and acknowledgment (ACK)/ negative ACK (NACK) feedback regarding the data communication for the non-self-contained slot configuration.

29. The base station of claim 28, wherein the indication identifies at least one of the minimum number of slots or the maximum number of slots associated with the fast sleep, and wherein the inter-slot scheduling configuration or the non-self-contained slot configuration is based at least in part on the minimum number of slots or the maximum number of slots.

30. The base station of claim 28, wherein the indication identifies one or more minimum values for a delay for the fast sleep between the data grant and the corresponding data communication, or between the data communication and the ACK/NACK feedback.

31. The base station of claim 28, wherein the indication indicates that the quality of service threshold or the user perception threshold is satisfied when the inter-slot scheduling or the non-self-contained slot configuration with fast sleep is to be performed.

32. The base station of claim 31, wherein the indication indicates one or more minimum values for a delay for the fast sleep between the data grant and the corresponding data communication, or between the data communication and the ACK/NACK feedback, and wherein the quality of service threshold or the user perception threshold is satisfied when the one or more minimum values for the delay are used.

33. The base station of claim 28, wherein the data grant is associated with a physical downlink control channel (PDCCH) and the corresponding data communication is associated with a physical downlink shared channel (PDSCH) or a physical uplink shared channel (PUSCH).

34. The base station of claim 28, wherein the data communication is associated with a physical downlink shared channel (PDSCH) or a physical uplink shared channel (PUSCH), and wherein the ACK/NACK feedback is associated with a hybrid automatic repeat request (HARD) process for the PDSCH or the PUSCH.

35. The base station of claim 28, wherein the inter-slot scheduling configuration or the non-self-contained slot configuration is signaled based at least in part on a determination that the inter-slot scheduling or the non-self-contained slot configuration is to be performed, and wherein the determination is based at least in part on the indication.

36. The base station of claim 28, wherein the inter-slot scheduling configuration or the non-self-contained slot configuration for the fast sleep is signaled based at least in part on receiving the indication that the fast sleep is supported by the UE.

37. A method of wireless communication performed by a user equipment (UE), comprising:
 signaling, to a base station, an indication that fast sleep is supported by the UE with regard to an inter-slot scheduling configuration or a non-self-contained slot configuration,
  wherein at least one of:
   the indication indicates that a quality of service threshold or a user perception threshold is satisfied when the inter-slot scheduling configuration or the non-self-contained slot configuration for fast sleep is to be used, or
   the indication identifies a minimum number of slots associated with the fast sleep; and
 receiving signaling indicating the inter-slot scheduling configuration or the non-self-contained slot configuration for the fast sleep,
  wherein the fast sleep is between a data grant and a corresponding data communication for the inter-slot scheduling.

38. The method of claim 37, wherein the indication identifies the minimum number of slots associated with the fast sleep.

39. The method of claim 37, wherein the data grant is associated with a physical downlink control channel (PDCCH) and the corresponding data communication is associated with a physical downlink shared channel (PDSCH) or a physical uplink shared channel (PUSCH).

40. A user equipment (UE) for wireless communication, comprising:

a memory; and one or more processors coupled to the memory, the memory and the one or more processors configured to:

signal, to a base station, an indication that fast sleep is supported by the UE with regard to an inter-slot scheduling configuration or a non-self-contained slot configuration, wherein at least one of:

the indication indicates that a quality of service threshold or a user perception threshold is satisfied when the inter-slot scheduling configuration or the non-self-contained slot configuration for fast sleep is to be used, or the indication identifies a minimum number of slots associated with the fast sleep; and receive signaling indicating the inter-slot scheduling configuration or the non-self-contained slot configuration for the fast sleep, wherein the fast sleep is between a data grant and a corresponding data communication for the inter-slot scheduling.

41. The UE of claim 40, wherein the indication identifies the minimum number of slots associated with the fast sleep.

42. The UE of claim 40, wherein the data grant is associated with a physical downlink control channel (PDCCH) and the corresponding data communication is associated with a physical downlink shared channel (PDSCH) or a physical uplink shared channel (PUSCH).

43. A method of wireless communication performed by a user equipment (UE), comprising:

signaling, to a base station, an indication that fast sleep is supported by the UE with regard to an inter-slot scheduling configuration or a non-self-contained slot configuration, wherein the indication identifies a maximum number of slots associated with the fast sleep; and receiving signaling indicating the inter-slot scheduling configuration or the non-self-contained slot configuration for the fast sleep, wherein the fast sleep is between a data communication and acknowledgment (ACK)/negative ACK (NACK) feedback regarding the data communication for the non-self-contained slot configuration.

44. The method of claim 43, wherein the data communication is associated with a physical downlink shared channel (PDSCH) or a physical uplink shared channel (PUSCH), and wherein the ACK/NACK feedback is associated with a hybrid automatic repeat request (HARD) process for the PDSCH or the PUSCH.

45. A user equipment (UE) for wireless communication, comprising:

a memory; and one or more processors coupled to the memory, the memory and the one or more processors configured to:

signal, to a base station, an indication that fast sleep is supported by the UE with regard to an inter-slot scheduling configuration or a non-self-contained slot configuration, wherein the indication identifies a maximum number of slots associated with the fast sleep; and receive signaling indicating the inter-slot scheduling configuration or the non-self-contained slot configuration for the fast sleep, wherein the fast sleep is between a data communication and acknowledgment (ACK)/negative ACK (NACK) feedback regarding the data communication for the non-self-contained slot configuration.

46. The UE of claim 45, wherein the data communication is associated with a physical downlink shared channel (PDSCH) or a physical uplink shared channel (PUSCH), and wherein the ACK/NACK feedback is associated with a hybrid automatic repeat request (HARQ) process for the PDSCH or the PUSCH.

* * * * *